United States Patent [19]

Rijckaert et al.

[11] Patent Number: 5,745,638
[45] Date of Patent: Apr. 28, 1998

[54] RECORDING/REPRODUCING APPARATUS OF THE HELICAL SCAN TYPE

[75] Inventors: Albert M. A. Rijckaert, Eindhoven, Netherlands; Ronald W. J. J. Saeijs, Nürnberg, Germany

[73] Assignee: U.S. Philips Corporation, New York, N.Y.

[21] Appl. No.: 673,781

[22] Filed: Jun. 20, 1996

[30] Foreign Application Priority Data

Jun. 22, 1995 [EP] European Pat. Off. ............ 95201688

[51] Int. Cl.$^6$ .................................................. H04N 5/76
[52] U.S. Cl. ........................ 386/54; 386/96; 386/104
[58] Field of Search .................... 386/4, 39, 54, 386/96, 98–102, 104; 360/13; 369/83; H04N 5/76, 5/92, 5/91, 9/79

[56] References Cited

U.S. PATENT DOCUMENTS

| | | | |
|---|---|---|---|
| 5,040,081 | 8/1991 | McCutchen | 386/96 |
| 5,398,138 | 3/1995 | Tomita | 386/96 |
| 5,481,370 | 1/1996 | Kim | 386/96 |
| 5,579,183 | 11/1996 | Van Gestel et al. | 360/48 |
| 5,596,581 | 1/1997 | Saeijs et al. | 386/104 |
| 5,625,461 | 4/1997 | Okamoto et al. | 386/96 |
| 5,627,691 | 5/1997 | Hong | 386/54 |
| 5,636,076 | 6/1997 | Minakawa et al. | 386/96 |

*Primary Examiner*—Trai Tran
*Attorney, Agent, or Firm*—Edward W. Goodman

[57] ABSTRACT

An apparatus of the helical scan type for reproducing a digital video signal from slant tracks (T) on a record carrier, the digital video signal having been recorded in first track portions (TP1) of the tracks. In an edit mode, the digital video signal is reproduced from the first track portions and a corresponding digital audio signal is recorded in second track portions (TP2) of the tracks. The apparatus includes at least one read head (RH) for reading the digital video signal recorded in the first track portions of the tracks and at least one write head (WH) for writing the second channel signal in the second track portions. The read head (RH) and the write head (WH) are positioned on a rotatable head drum at such a location relative to each other that when the read head reads the digital video signal from a first track portion of a first track ($T_{i+24}$), the write head writes the second channel signal in a second track portion in a second track ($T_i$), the second track being spaced a specified number (24) of tracks away from the first track.

7 Claims, 3 Drawing Sheets

RECORDING/REPRODUCING APPARATUS OF THE HELICAL SCAN TYPE

BACKGROUND OF THE INVENTION

1. Field of the Invention

The invention relates to an apparatus of the helical scan type, for reproducing a digital video signal from slant tracks on a record carrier, the digital video signal being recorded in first track portions of the tracks decoding means for decoding said channel signal so as to obtain said digital video signal.

2. Description of the Related Art

An apparatus as generally defined above is known from European Patent Application EP-A-492,704, corresponding to U.S. Pat. No. 5,245,483. The digital video signal is data compressed and subsequently channel encoded so as to obtain the first channel signal for recording in the first track portions in the tracks. The data compression technique carried out on the digital video signal may result in the digital video signal being encoded into an MPEG encoded digital information signal.

The MPEG encoded information signal comprises transport packets that may occur irregularly in the serial datastream of the MPEG transport stream received. The ISO/IEC 13.818 international standard, part 1 'Systems', dated 13 Nov. 1994, comprises a description of a transport system for transmitting an MPEG information signal, which may include a data compressed digital video signal and a corresponding data compressed digital audio signal, for broadcasting purposes or for transmission via a cable network. The MPEG information signal is in the form of transport packets comprises 188 bytes of information each.

Packets in the MPEG serial data stream comprise, apart from "system information", one kind of information, that is: either a portion of a video signal, or a portion of an audio signal or a portion of a data signal. A plurality of video signals and/or a plurality of audio signals and/or a plurality of data signals may be transmitted via the transport packets in the MPEG serial data stream. A packet also comprises information of only one of the video signals, or one of the audio signals or one of the data signals transmitted via the MPEG serial data stream.

A transmission of such MPEG information signal in the form of a recording on and a reproduction from a record carrier, requires special measures to be taken in order to realize such kind of transmission.

Earlier filed applications, i.e., U.S. patent application Ser. No. 08/225,193, having a filing date of Apr. 8, 1994, now U.S. Pat. No. 5,579,183 (PHN 14.818), and U.S. patent application Ser. No. 08/253,535, having a filing date of Jun. 3, 1994, now U.S. Pat. No. 5,596,581 (PHA 21.886), describe various of such measures to realize a recording and reproduction of an MPEG information signal.

It can generally be said that the recording of a complete MPEG information signal is not well possible because of the too high data rate of the MPEG information signal.

One of the video signals and its corresponding audio signal(s) included in the MPEG serial datastream are now selected for recording. As a consequence, generally, transport packets will be selected on an irregular basis as a function of time. In order to preserve the timing relation between the subsequent packets selected, after having recorded and reproduced the packets, the above-noted U.S. patents describe the measure of inserting timing information (or a 'time stamp') in each of the packets recorded. Upon reproduction, the timing relation between the subsequent packets can be regained using the time stamps. The packets thus obtained are recorded in the first track portions after having been subjected to a channel encoding step.

SUMMARY OF THE INVENTION

The invention aims at providing an apparatus of the helical scan type which is capable of carrying out an edit mode so that an additional audio signal can be added to the digital video signal recorded in the first track portions of the tracks.

The apparatus, comprising read means comprising at least one read head for reading a channel signal recorded in said first track portions of the tracks, decoding means for decoding said channel signal so as to obtain said digital video signal, and output means for outputting the digital video signal, in the opening paragraph is characterized in that the apparatus is adapted to reproduce, in an edit mode, said digital video signal and to record a digital audio signal in second track portions of the tracks, the apparatus further comprising input means for receiving the digital audio signal, encoding means for encoding said digital audio signal so as to obtain a second channel signal, and write means comprising at least one write head for writing the second channel signal in said second track portions, the at least one read head and the at least one write head being positioned on a rotatable head drum at such a location relative to each other that when the read head reads said first mentioned channel signal from a first track potion of a first track, the write head writes said second channel signal in a second track portion in a second track, said second track being spaced a specified number of tracks away from said first track, the apparatus further being adapted to reproduce in a normal reproduction mode said digital video signal and said digital audio signal from said first and second track portions respectively, using said read means.

The invention is based on the following recognition. In a normal recording mode, where a video signal and a corresponding audio signal are recorded on a record carrier, the encoding of the audio signal and the video signal is such that the video signal and its corresponding audio signal are recorded in substantially the same tracks on the record carrier. Editing is realized by reproducing the digital video signal from the first track portions of the tracks and, at the same time, recording the additional audio signal in the second track portions of the tracks on the record carrier. Reproducing the digital video signal means: (a) a channel decoding step for channel decoding the first channel signal, and (b) data expansion (e.g., in an MPEG decoder) for data expanding the decoded channel signal so as to regenerate a replica of the digital video signal. The replica of the digital video signal can be made visible on a TV screen. Further, the recording of the additional audio signal means: (a) an encoding step (e.g., in an MPEG encoder) so as to bring the digital audio signal in the same format as the digital video signal, and (b) a channel encoding step so as to obtain the second channel signal for recording in the second track portions. The additional audio signal recorded in the second track portions of the tracks should be reproduced in a later reproduction step together with the digital video signal in such a way that it is lip synchronous with the digital video signal reproduced from the first track portions.

The channel decoding step during the reproduction of the digital video signal results in a delay, when expressed in number of track intervals, of, for example, 6 track intervals.

as the error correction step in the channel decoding step is carried out across the information recorded in 6 tracks. One track interval equals a time interval in which one track is scanned by a read head. Further, the error correction decoding itself also requires a specified delay, e.g., 3 track intervals. Next, the MPEG decoding step may require a delay of, e.g., 6 track intervals. As a result, a picture is be made visible on the screen a total time delay of 15 track intervals after the information corresponding to that picture has been read from the record carrier.

In the same way, the MPEG encoder requires a time interval of, e.g., 2 track intervals to encode a block of audio information of the additional audio signal. Further, again an error correction encoding is carried out on the additional audio signal that is recorded in 6 tracks. The error correction encoding itself may require a time interval of 1 track interval. As a result, audio information supplied to the input means are recorded 9 track intervals later in the second track portions of the tracks. So, if no precautions are taken, the additional audio signal that should be lip synchronous with the video signal, is recorded 24 tracks 'later' on the record carrier. Reproduction of the video signal and the additional audio signal in a subsequent normal reproduction mode, using the read means, will result in an audio signal that is delayed by a time interval, because of the fact that the audio signal is recorded 24 tracks 'later', compared to the corresponding video signal reproduced, so that there is no lip-synchronicity.

In accordance with the invention, the additional audio signal should be recorded 24 tracks 'earlier' in the tracks, that is, in substantially the same tracks as the corresponding video signal, so that when the information recorded in the tracks is reproduced by the read means, the additional audio signal is substantially lip-synchronous with the corresponding video signal.

The additional audio signal can be recorded in the second track portions of the tracks by means of write means in the form of one or more additional heads that is (are) located at a higher or lower position on the head drum.

BRIEF DESCRIPTION OF THE DRAWINGS

These and other aspects of the invention will be apparent from and further elucidated with reference to embodiments described in the following figure decription, in which.

DESCRIPTION OF THE PREFERRED EMBODIMENTS

Figure 1:
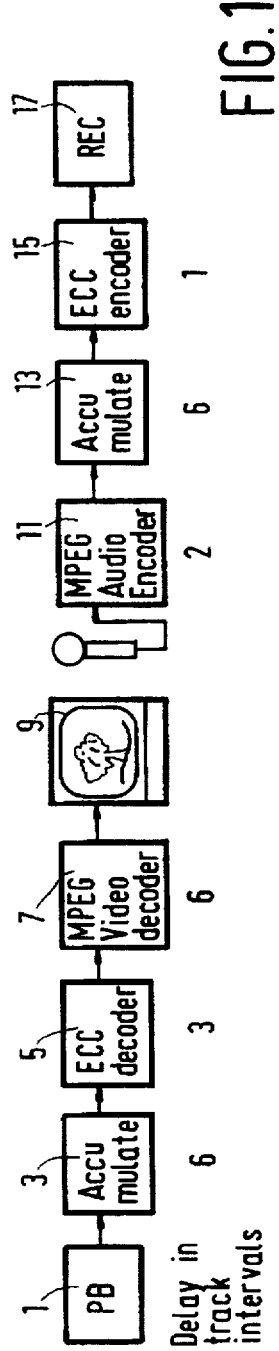
FIG. 1 shows the edit mode.

FIG. 1 shows an example of an editing operation being carried out. In a reading step 1, the digital video signal, which is in the form of a first channel signal, is read from first track portions of tracks on a record carrier. Next, in an accumulation step 3, the information recorded in the first track portions of a number of subsequent tracks (e.g., 6) is combined so that an error correction step 5 can be carried out. The error corrected information is decoded in an MPEG decoding step 7 so as to obtain the replica of the digital video signal that is made visible on a TV screen 9. At the same time, an additional audio signal that is made lip-synchronous with the video signal made visible on the TV screen 9, is subjected to an MPEG audio encoding step 11. Next, MPEG encoded audio information is accumulated, in an accumulation step 13, until sufficient information is available for carrying out an error correction encoding on it. The error correction encoding step 15 is again carried out on information that is recorded in the second track portions of 6 tracks. Next, the signal thus obtained is recorded in the second track portions in the tracks on the record carrier in a writing step 17.

The accumulation step 3 results in a delay of 6 track intervals, where the delay of one track interval equals a time interval in which one track is scanned by a read head. In the present example, it is assumed that the error correction decoding step results in a delay of 3 track intervals. Further, the subsequent MPEG decoding step results in a delay of 6 track intervals.

The recording path of the additional audio signal includes delays of 2 track intervals for the encoding step 11, 6 track intervals for the accumulation step 13, and 1 track interval for the channel encoding (error correction encoding) step 15.

As a consequence, the additional audio signal that corresponds to the video signal reproduced is recorded 24 tracks later on the record carrier. As indicated above, however, an audio signal that corresponds to a video signal should be recorded in substantially the same tracks as the video signal.

Figure 2:
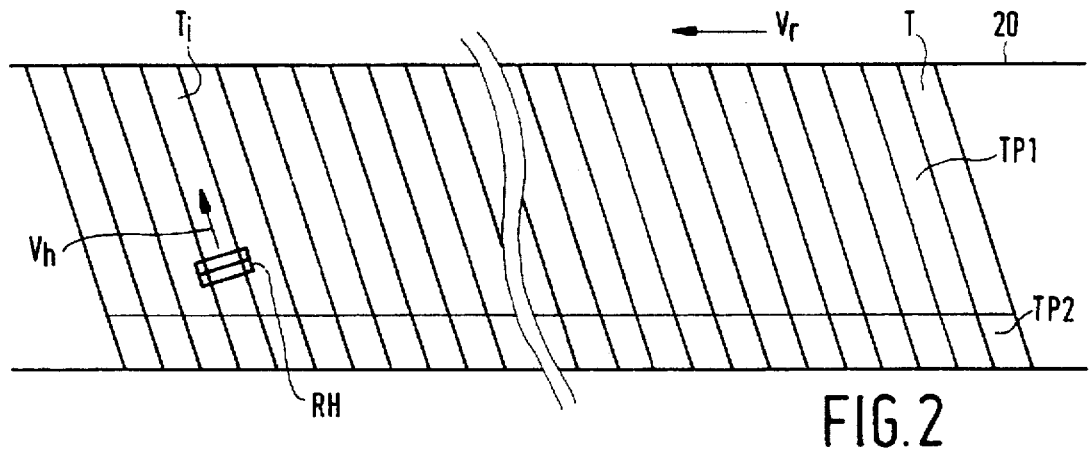
FIG. 2 the record carrier when carrying out an edit mode.

FIG. 2 shows, schematically, the slant tracks T recorded in an earlier recording step on the record carrier 20. The record carrier 20 is seen from the magnetic side, that is: it shows the side of the record carrier that contacts the head drum. The slope of the tracks compared to the longitudinal direction of the record carrier 20 is exaggerated so as to simplify the explanation. Tracks comprise first track portions TP1 and second track portions TP2. The digital video signal has been recorded in the first track portions. As explained above, the digital video signal may have been recorded in the first track portions in the form of so-called MPEG packets, after having been subjected to an MPEG encoding step. The first track portions may also comprise packets containing an original audio signal that has been recorded together with the original recording of the video signal. The arrow $v_r$ denotes the direction of travel of the record carrier 20. A reading head RH is present for reading the information recorded in the tracks T. The arrow $v_h$ denotes the direction of travel of the reading head RH.

The second track portions TP2 are present for recording an additional audio signal in an edit mode of operation. In the edit mode of operation, the reading head RH reads information that is recorded in the first track portion of the track $T_i$. As explained above, the video information recorded in the first track portion of the track $T_i$ is made visible on the TV screen 15 track intervals later. When the additional audio signal that corresponds to the video signal that is recorded in the first track portion of the track $T_i$, is recorded in the second track portion of that same track, a time interval of 24 track interval has elapsed, as explained above.

Figure 3:
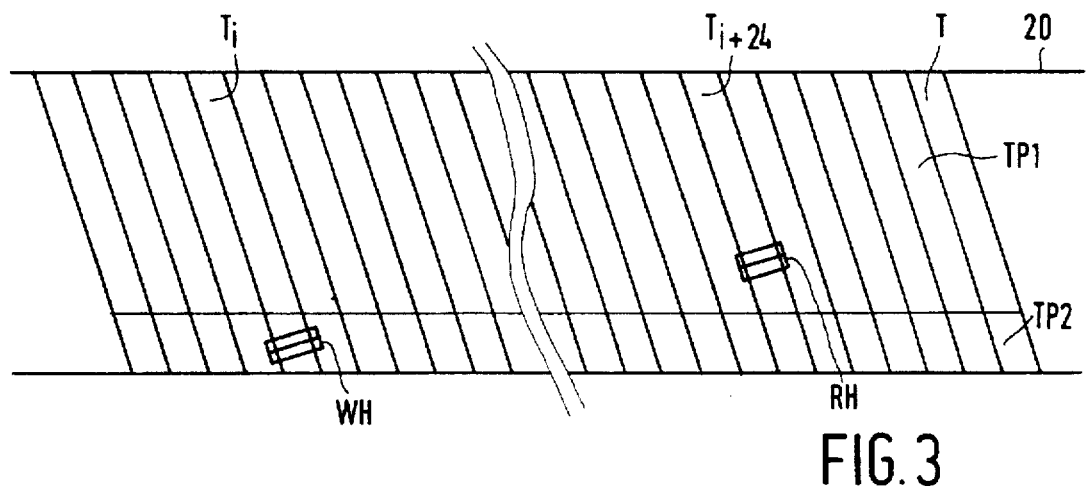
FIG. 3 shows the record carrier when carrying out the edit mode, but 24 track intervals later.

FIG. 3 shows the time instant when the additional audio signal is recorded in the second track portion of the track $T_i$. As can be seen, the reading head RH now reads information from the first track portion of the track $T_{i+24}$. A write head WH is available, which records the audio information in the second track portion of the track $T_i$. As a result, the additional audio signal that corresponds to the video information that is recorded in the track $T_i$, is recorded in that same track. The form in which the additional audio signal is recorded in the second track portion may again be in the form of the earlier mentioned MPEG packets.

During a subsequent reproduction step, where it is desired to reproduce the video information recorded in the first track portions and the additional audio information recorded in the second track portions, the read head RH can be used to reproduce both information signals from both track portions. Moreover, apparatuses provided with the at least one reading head RH only, and not provided with the write head WH, will also be capable of reproducing the video signal and each one of the two audio signals, either the original one or the additional one, or, maybe, both.

In another embodiment of the subsequent reproduction step, the write head WH is capable of also reading the video information and the corresponding audio information from the first and second track portions, respectively.

Figure 6:
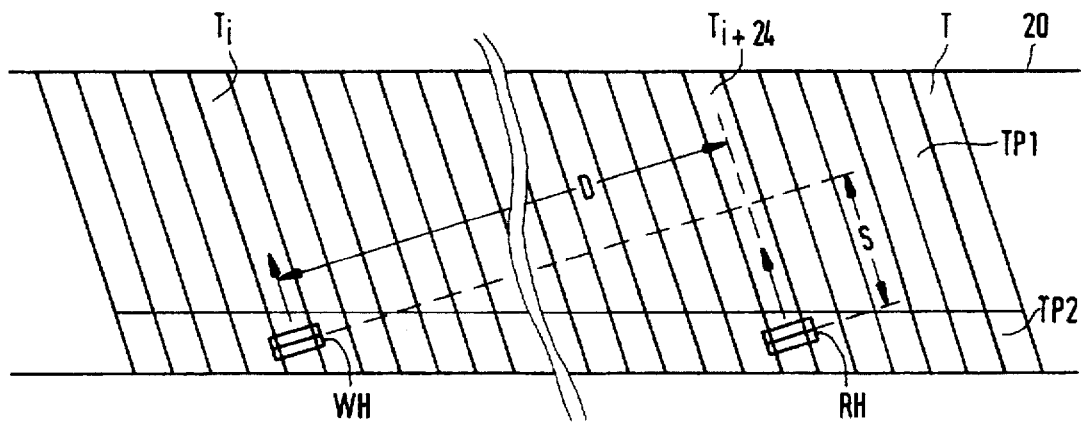
FIG. 6 shows a preferable positioning of the heads relative to the tracks on the record carrier.

When viewing FIG. 3, it is seen that the heads WH and RH are not at the same position, viewed in the longitudinal direction of the tracks. Preferably, however, the heads are located at the same position, viewed in the longitudinal direction of the tracks, for the reason to minimize crosstalk. The position of the heads in the preferable situation is shown in FIG. 6.

In order to minimize crosstalk in the edit mode of operation, the write head WH should not write information on the record carrier, while, at the same time, the read head RH reads information from the record carrier. With the positioning of the heads as shown in FIG. 6, when both heads scan the second track portions TP2, the write head writes the second channel signal in the second track portion of the track $T_j$ and the read head is inhibited. When the heads are positioned above the first track portions TP1, the write head is inhibited and the read head reads the information recorded in the first track portion TP1 of the track $T_{i+24}$.

As regards the relative position to each other of the heads RH and WH on the head drum, it can be seen that there is a distance D of 24 times the track pitch between the heads, and in the preferable situation, also a shift S of 24 times the track offset, which results in a certain angle α between the two heads, as positioned on the head drum, see also the description of FIG. 5 below.

Figure 4:
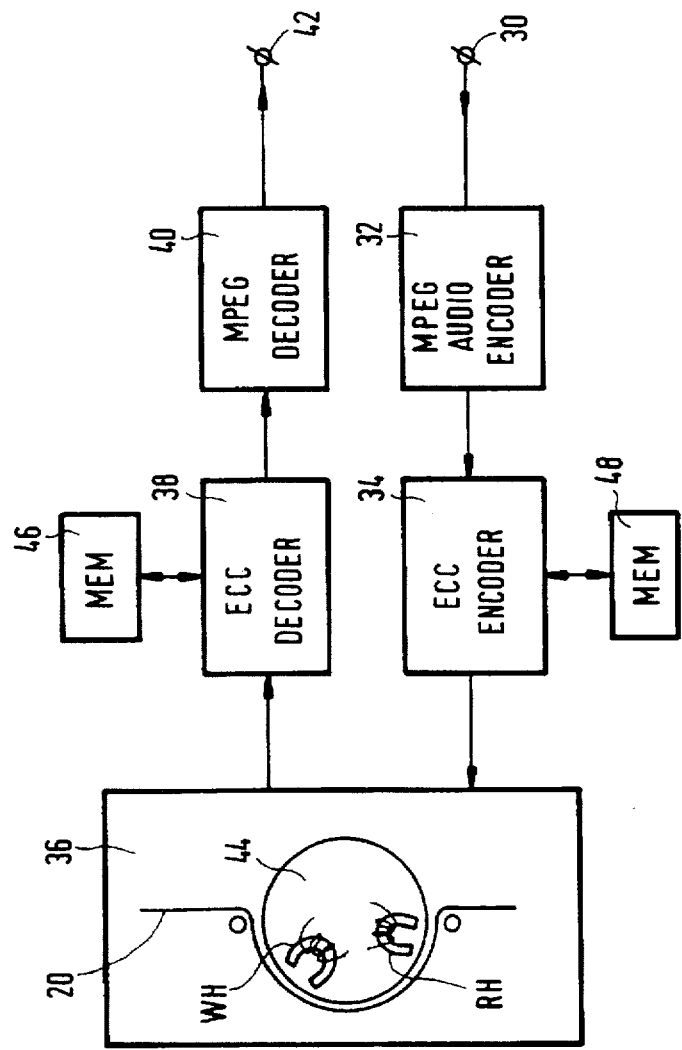
FIG. 4 shows an embodiment of the apparatus.

FIG. 4 shows schematically, an embodiment of the apparatus of the helical scan type in accordance with the invention. The apparatus has an input terminal for receiving an audio signal. The input terminal is coupled to an input of an MPEG audio encoder 32, which has an output coupled to an input of an error correction encoder 34. An output of the encoder 34 is coupled to an input of a helical scan read/write unit 36. An output of the helical scan read/write unit 36 is coupled to an input of an error correction decoder 38, which has an output coupled to an input of an MPEG decoder 40. An output of the decoder 40 is coupled to an output terminal 42.

The read/write unit 36 comprises at least one read head RH (preferably two reading heads are available, located at 180° around the circumference of the head drum) and at least one write head WH accommodated on a rotatable head drum 44. The record carrier 20 is wrapped around the head drum 44 over a certain wrapping angle around the drum. The wrapping angle is, in numerous occasions, slightly larger than 180°.

The apparatus of FIG. 4 functions as follows. In an edit mode, read head RH reads information, in the form of the first channel signal, that is recorded in the first track portions of the tracks. For enabling an error correction to be carried out in the decoder 38, the information recorded in the first track portions of 6 subsequent tracks is read out and stored in a memory 46. After having carried out the error correction, the error corrected information is supplied to the decoder 40. A decoded digital video signal is supplied to the output terminal 42. An additional audio signal is supplied to the input terminal 30 and encoded in the MPEG audio encoder 32. Next, an error correction encoding step is carried out on MPEG encoded audio information that will be stored in the second track portions of 6 subsequent tracks. To that purpose, MPEG encoded audio information is stored in a memory 48 and subsequently error correction encoded. Next, the error correction encoded information is recorded as the second channel signal in the second track potions of the tracks by means of the write head WH.

In a subsequent normal reproduction mode, either the read head RH or the write head WH (in the case it is capable of functioning as a read head as well) reads the information recorded in the first and second track portions of the tracks. That is: the first channel signal from the first track portions and the second channel signal from the send track potions. An error correction step is carried out on the first and second channel signals in the unit 38. An MPEG decoding step is carried out on both channel decoded signals in the decoder 40. At the output terminal 42, the digital video signal and the additional audio signal is available.

It may be clear that, upon normal reproduction, also the original audio signal that has been recorded in the first track portions, will be available at the output terminal 42. Selection between the two audio signal's, the original one and the additional one, can be realized by the user by means of a selection switch (not shown) incorporated in the output means of the apparatus.

In another embodiment of the apparatus, the apparatus is capable of carrying out another edit step, namely, in a situation where the first track portions include the digital video signal and the second track portions already include an additional audio signal. In this edit step, the at least one read head RH is capable of reading the information from both the first and the second track portions of the tracks. When viewing FIG. 2, the read head RH reads the information included in the track portions TP1 and TP2 of the track $T_i$. Both the video signal recorded in the first track portions and the additional audio signal recorded in the second track portions are channel decoded in the decoder 38 and MPEG decoded in the decoder 40. The audio signal decoded may subsequently be mixed with a second additional audio signal so as to obtain a composite audio signal. This composite audio signal will be encoded in the encoder blocks 32 and 34 and subsequently recorded in the second track portions. FIG. 3 or 6 show the situation where the composite audio signal is recorded in the second track portion TP2 of the track $T_i$.

Figure 5:
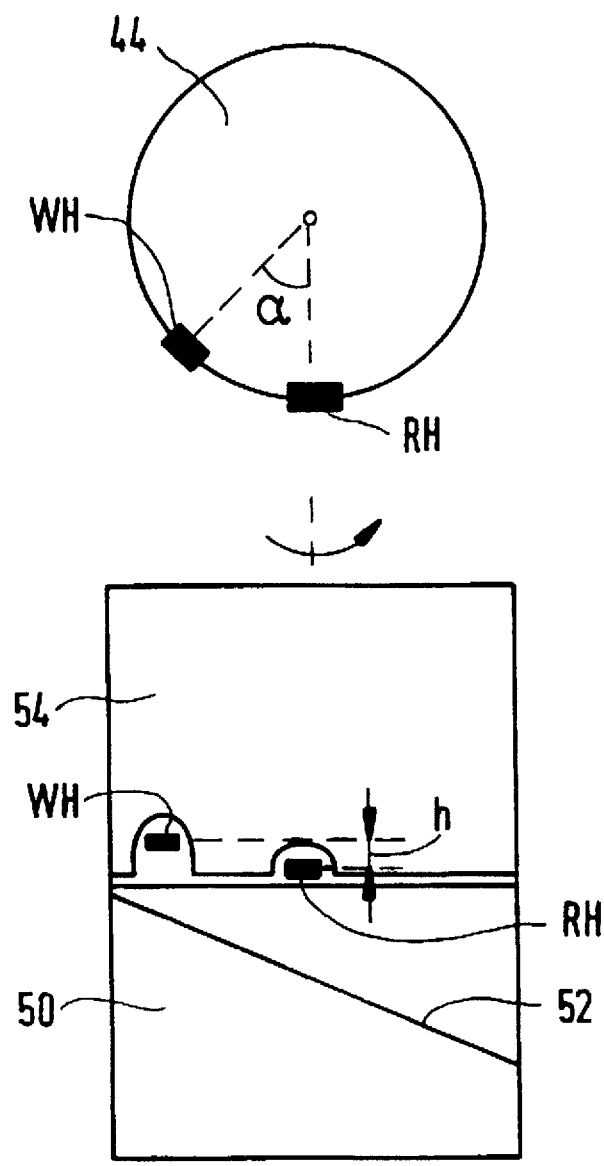
FIG. 5 shows an embodiment of the head drum.

FIG. 5 shows the construction of the rotating head drum 44, provided with the read head RH and the write head WH. FIG. 5 shows a top view of the head drum and a side view of the drum. The top view shows that the heads are spaced an angle α around the circumference of the head drum 44. The side view shows the head drum 44 having a stationary lower drum part 50 on which a ruler 52 is present. The heads RH and WH are rigidly positioned on the rotating upper drum 54. FIG. 5 shows that the write head WH is positioned a distance h higher than the read head RH. The distance h accounts for the fact that the write head WH is positioned a distance of 24 times the track pitch above the read head RH. In VHS, where the track pitch is 29 μm, the distance h equals 0.7 mm. Further, the angle α accounts for the preference explained above that, in order to minimize crosstalk, the two heads RH and WH are roughly at the same position in the tracks, viewed in the length direction of the tracks. The angle α thus accounts for 24 times the track offset, which is roughly 0.5°, so that the angle α equals roughly 12°.

It should be observed that the invention is not restricted only to the embodiments described, but is limited and defined only by the appended claims.

What is claimed is:

1. Apparatus of the helical scan type, for reproducing a digital video signal from slant tracks on a record carrier, the digital video signal being recorded in first track portions of the tracks, the apparatus comprising:

read means comprising at least one read head for reading a first channel signal recorded in said first track portions of the tracks;

decoding means for decoding said first channel signal to form said digital video signal; and output means for outputting the digital video signal, wherein the apparatus is adapted to reproduce, in an edit mode, said digital video signal and to record a digital audio signal in second track portions of the tracks, said apparatus further comprising:

input means for receiving the digital audio signal;

encoding means for encoding said digital audio signal so as to obtain a second channel signal; and write means comprising at least one write head for writing the second channel signal in said second track portions, the at least one read head and the at least one write head being positioned on a rotatable head drum at such a location relative to each other that when the read head reads said first channel signal from a first track portion of a first track, the write head writes said second channel signal in a second track portion in a second track, said second track being spaced a specified number of tracks away from said first track, the apparatus further being adapted to reproduce, in a normal reproduction mode, said digital video signal and said digital audio signal from said first and second track portions, respectively, using said read means.

2. Apparatus as claimed in claim 1, characterized in that said read head of said reading means is adapted to read, in said normal reproduction mode, said digital video signal and said digital audio signal from said first and second track portions, respectively.

3. Apparatus as claimed in claim 1, characterized in that said at least one write head of said write means forms part of said reading means, said at least one write head further being adapted to read, in said normal reproduction mode, said digital video signal and said digital audio signal from said first and second track portions, respectively.

4. Apparatus as claimed in claim 1, characterized in that the at least one read head and the at least one write head are spaced a distance N×p apart, viewed in the direction of the rotational axis of the rotatable head drum, where N is an integer number and p is the track pitch of the tracks as recorded on the record carrier, said at least one read head and said at least one write head being spaced a distance N×t apart viewed along a line on the circumference of the rotatable head drum running in a direction transverse to said direction of the rotational axis of the rotatable head drum, where t is the track offset between two subsequent tracks.

5. Apparatus of the helical scan type, for reproducing a digital video signal and a corresponding digital audio signal from slant tracks on a record carrier, the digital video signal being recorded in first track portions of the tracks, the digital audio signal being recorded in second track portions of the tracks, the apparatus comprising:

read means comprising at least one read head for reading a first channel signal recorded in said first track portions of the tracks and a second channel signal recorded in said second track portions;

decoding means for decoding said first and second channel signals to form said digital video signal and said digital audio signal, respectively; and output means for outputting the digital video signal and the digital audio signal, wherein the apparatus is adapted to reproduce, in an edit mode, said digital video signal and said digital audio signal from said first and second track portions, respectively, to receive an additional digital audio signal, and to record a composite digital audio signal obtained from said digital audio signal and said additional digital audio signal in said second track portions of the tracks, the apparatus further comprising:

input means for receiving the additional digital audio signal;

signal combining means for combining the digital audio signal and the additional digital audio signal to form said composite digital audio signal;

encoding means for encoding said composite digital audio signal to form said second channel signal; and write means comprising at least one write head for writing the second channel signal in said second track portions, the at least one read head and the at least one write head being positioned on a rotatable head drum at such a location relative to each other that when the read head reads said first and second channel signals from first and second track portions, respectively, of a first track, the write head writes said second channel signal in a second track portion in a second track, said second track being spaced a specified number of tracks away from said first track.

6. Apparatus as claimed in claim 2, characterized in that the at least one read head and the at least one write head are spaced a distance N×p apart, viewed in the direction of the rotational axis of the rotatable head drum, where N is an integer number and p is the track pitch of the tracks as recorded on the record carrier, said at least one read head and said at least one write head being spaced a distance N×t apart viewed along a line on the circumference of the rotatable head drum running in a direction transverse to said direction of the rotational axis of the rotatable head drum, where t is the track offset between two subsequent tracks.

7. Apparatus as claimed in claim 3, characterized in that the at least one read head and the at least one write head are spaced a distance N×p apart, viewed in the direction of the rotational axis of the rotatable head drum, where N is an integer number and p is the track pitch of the tracks as recorded on the record carrier, said at least one read head and said at least one write head being spaced a distance N×t apart viewed along a line on the circumference of the rotatable head drum running in a direction transverse to said direction of the rotational axis of the rotatable head drum, where t is the track offset between two subsequent tracks.

* * * * *